(No Model.)　　　　　　　A. H. EMERY.　　　2 Sheets—Sheet 1.
PLATFORM SCALE.
No. 278,903.　　　　　　　　　　　　　　Patented June 5, 1883.
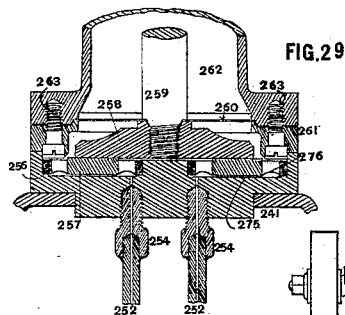
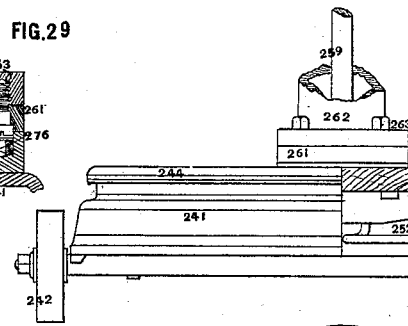
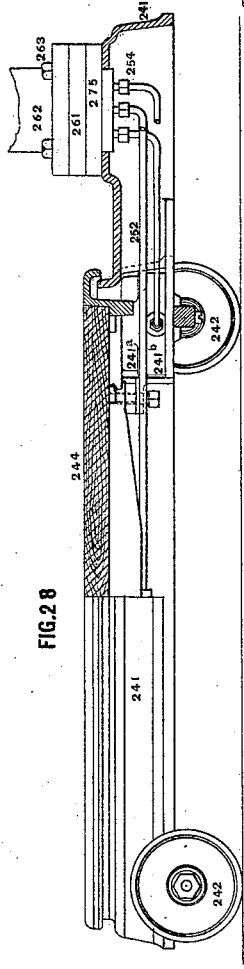
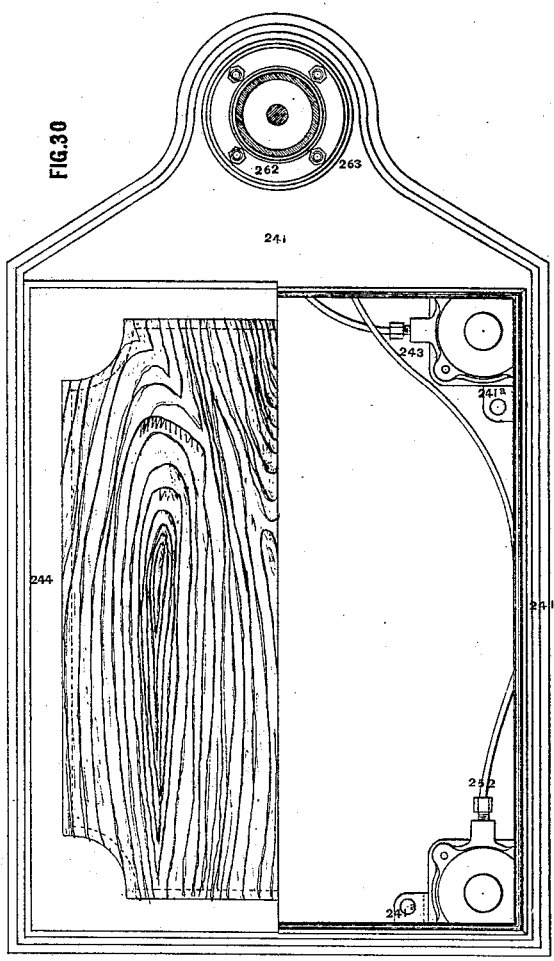
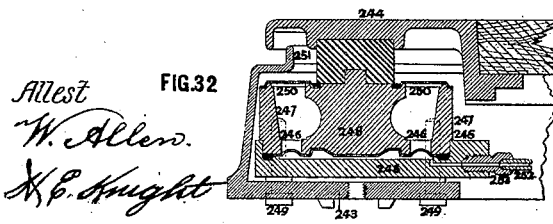
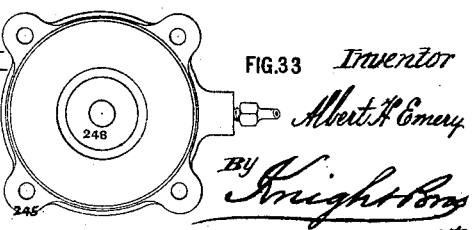

(No Model.) 2 Sheets—Sheet 2.
A. H. EMERY.
PLATFORM SCALE.
No. 278,903. Patented June 5, 1883.
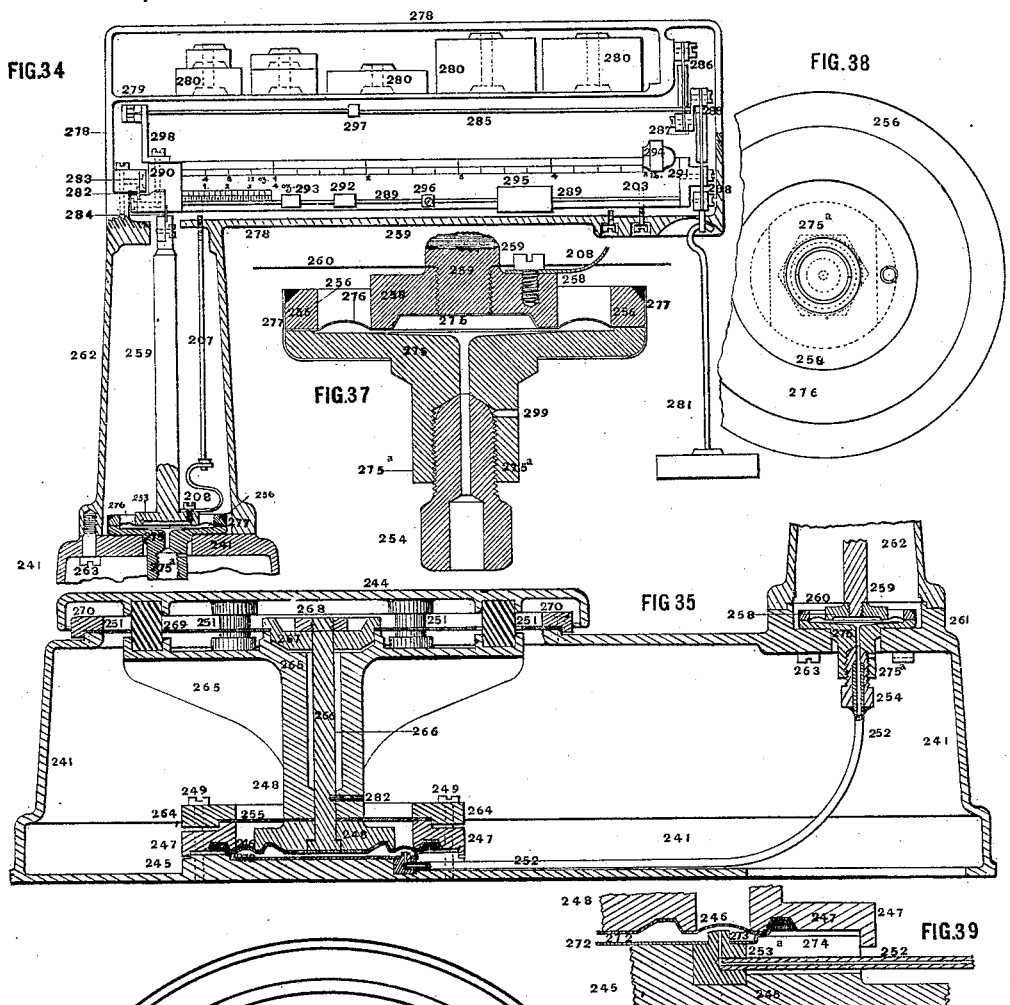
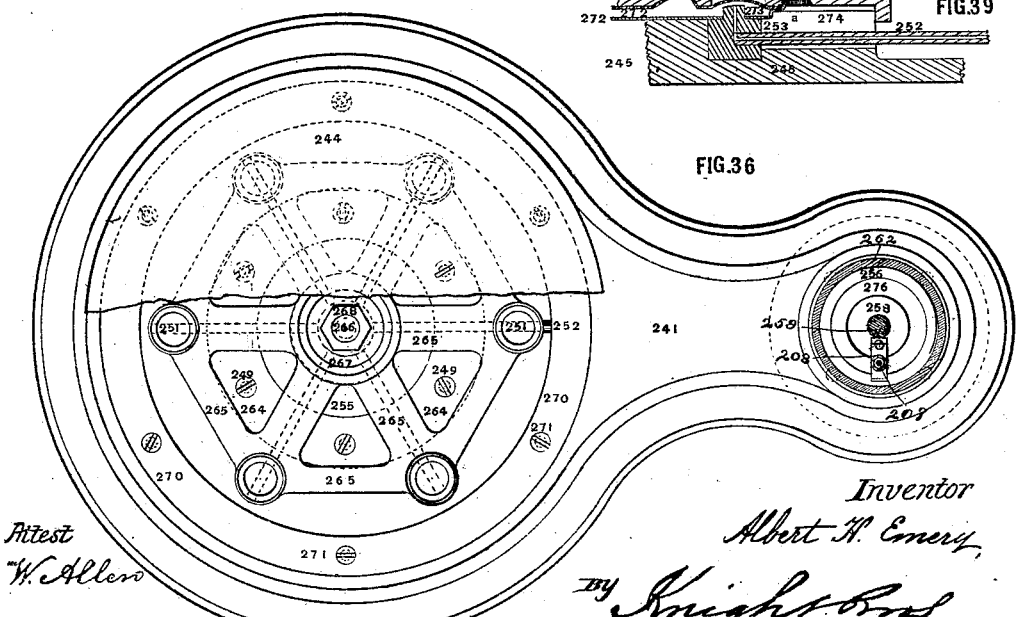
Inventor
Albert H. Emery,
by Knight Bros
attys
Attest
W. Allen
Harry C. Knight

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

PLATFORM-SCALE.

SPECIFICATION forming part of Letters Patent No. 278,903, dated June 5, 1883.

Application filed February 5, 1881. (No model.)

*To all whom it may concern:*

Be it known that I, ALBERT H. EMERY, of the city, county, and State of New York, have invented certain new and useful Improvements in Scales, of which the following is a specification.

The invention relates to portable platform-scales with hydraulic-pressure chambers. The bed-frame of the scale is constructed with a shelf or shelves for the reception of one or more platform-supports which are bolted to the base. Springs of rubber or other material are interposed between the platform and its supports. The weigh-beam has its fulcrum attachments on a hollow pillar flanged for attachment to the bed. The pressure is transmitted from a liquid-chamber in the base of the platform-support through a pipe connected to the base of said support by means of a sealing-plug constructed with a recessed nipple to permit the escape of air in filling the chamber, as hereinafter described. The other end of the pressure-pipe is connected by a screw-plug to the base of the liquid-chamber, from which pressure is transmitted to a column acting on the beam, a vent-aperture being provided in the neck of the liquid-chamber to allow the escape of air contained in said neck while screwing a pipe-plug into it, the pipe and chamber having previously been filled with liquid. The vertically-moving parts are held against horizontal motion by flexible plates clamped thereto and to proper parts of the bed or frame. The weigh-beam is provided with a weight-rod carrying a tare-weight limited in its movement by an adjustable stop, so that the range of motion of the weight can be varied to correspond with the weight of a scoop or other containing-vessel on the platform. In order to allow the limited vertical play of the platform while preventing its separation from the bed, screws are employed, passing through lugs within the bed and fixed in the under side of the platform, with heads to constitute stops by coming in contact with the lugs when the platform is lifted.

In the accompanying drawings the invention is represented in twelve figures, numbered 28 to 39, inclusive. Figure 28 is a side elevation, partly in section, of the lower part of a scale illustrating the invention. Fig. 29 is a vertical section of the base of the pillar and pressure-column on a large scale. Fig. 30 is a plan of the entire lower part with a portion of the platform removed. Fig. 31 is an end elevation of the same, partly in section. Fig. 32 is a vertical section of one corner of the bed and platform and of one of the hydraulic supports. Fig. 33 is a plan of said support. Fig. 34 is a front elevation of the upper portion of the scale, partly in section, in a modified form. Fig. 35 is a vertical section of the lower portion, illustrating corresponding modifications in details of construction. Fig. 36 is a plan of the parts shown in Fig. 35, with a portion of the platform removed. Fig. 37 is a vertical section, on a larger scale, of the base of the pressure-column and the pressure-chamber on which it rests. Fig. 38 is a plan of a portion of the pressure-chamber. Fig. 39 is a vertical section of a portion of the pressure-support chamber and its connections.

241 represents the bed, which may be mounted on wheels 242, if desired. In carrying out the first part of the invention the said bed is constructed with shelves 243 at the corners, for the reception of the supports of the platform 244. These supports are four in number in the illustration given in Figs. 28 to 33. They consist each of a flanged and chambered base, 245, a pressure-diaphragm, 246, a shell, 247, between which and the base the edge of the diaphragm is clamped, and a column, 248, resting on the diaphragm and supported by the pressure of the liquid in the chamber beneath it. The support, base, and shell are fastened together and to the shelf of the bed by screws 249. The upper part of the column is fixed against horizontal motion by a flexible annular plate, 250, secured at its inner edge within a groove in the top of the column and at its outer edge to the top of the shell 247. The columns are surmounted by springs 251, of rubber or other material, to prevent shocks given to the platform being transmitted to the supports on which the corners of the platform rest.

The liquid-pressure pipe 252 may be attached to the chamber in communication with the outlet-duct by means of a coupling and sealing plug, 253, soldered to the said pipe and screwed into the chamber-base, where the metal of the base is sufficiently homogeneous and free from porosity. It is preferred, however, to secure the end of the pipe to a nipple applied removably to the case, in connection with an impervious lining of sheet metal, as hereinafter described. The pipes 252, one for each support, which, in the illustration above described, are four in number, are carried separately to as many pressure-chambers at the base of the column, which transmits the pressure to the weigh-beam.

The mode of applying a number of pressure-chambers to the weigh-beam column constitutes, in part, the subject of another application for Letters-Patent, and is not essential to the present invention.

A plurality of pressure-chambers suitable for use with a plurality of platform-supports are illustrated in Fig. 29.

254 are coupling and sealing plugs connecting each of the pipes 252 with a pressure-chamber, 275, said chambers being covered by diaphragms 276, secured at their edges by rings 256 and supporting separate short columns 257, on all of which the base 258 of the weigh-beam column 259 rests. The column-base 258 is connected to the column 259 by a screw-thread, and clamps the inner edge of a flexible fixing-plate, 260, the outer edge of which is held by a ring, 261, fastened to the flanged bottom of the pillar 262 by screws 263, some of which, passing through the bed 241, fix the pillar to the bed. The pressure-column is thus held concentrically within the hollow pillar, while having freedom for the slight vertical motion required, and the entire structure 258 259 260 261 262 may be lifted bodily from the base without disturbing the hydraulic-pressure-chambers.

Figs. 34 to 39, inclusive, illustrate the application of the invention to a smaller class of scales with a single support under the platform and a single pressure-chamber under the weigh-beam column. In this illustration the support-chamber base 245 is shown as formed in one piece with the bed. The fixing-plate 255, which stays the lower end of the support-column 248, is clamped by a ring, 264, which, together with the case or ring 247 and base 245, is held by the screws 249. The support-column 248 is extended upward and horizontally in the form of a skeleton frame, 265, as shown in Figs. 35 and 36, which sustains the platform 244 through the medium of springs 251, as in the other illustration. A central bolt, 266, passes upward through the short column 248 and receives at top a head, 267, and a nut, 268, fastening the whole together in one connected column, and clamping the fixing-plates 255 and 269, the latter and upper one of which is held on the outside by a ring, 270, and screws 271, clamping the said plate to the bed or main frame 241. The bolt 266 may be held from turning while the nut is applied either by making its head angular or by the insertion of a pin or screw, 282.

The pressure-pipe 252 is permanently secured in a sealing-block, 253ª, Fig. 39, to which is soldered an impervious sheet-metal lining, 272, covering the base of the chamber and soldered at its periphery to the diaphragm 246, so as form a sealed chamber. A nipple, 273, projecting from the sealing-block 253ª through the lining 272 affords a communication between the chamber and the pipe. This nipple, by rising into the highest part of the chamber, constitutes an effective means of allowing the complete escape of air in filling the chamber with liquid. A recess or channel, 274, is formed in the chamber-base 245 to receive the pipe 252 and connecting-plug 353ª. The pipe 252, plug 253ª, lining 272, and diaphragm 246, having been previously connected together, are readily adjusted to the base, and can be as readily removed therefrom at any time after taking off the clamping-ring 264 and case 247 and the platform-support column.

When a single pressure-support is used the flanged pillar 262 may be bolted directly to the bed, as illustrated in Figs. 34 and 35, inclosing within it the chamber-plate 275, which is covered by a diaphragm, 276, secured at its periphery by a ring, 256, as before. The ring 261 may be cast with the bed-frame, as in Fig. 35. In some cases the fixing-plate 260 and ring 261 may be dispensed with, the pillar 262 being bolted directly to the bed, as in Fig. 34.

Fig. 37 is an enlarged sectional view, and Fig. 38 a plan, of the chamber with the lower part of the column in position. Dotted lines in the plan show the flat form of the neck 375ª of the chamber-base, to adapt it to receive the wrench in screwing it on the plug 354.

299, Fig. 37, represents a vent-aperture, to permit the escape of air forced out of the screw-neck while putting together the pipe and chamber, said pipe and chamber having been previously filled with liquid.

277 represents a ring or envelope surrounding the plate 275 and ring 256, so as to cover and seal the joint between them, as described and claimed in another application. The pressure-column 259 may rest directly on the diaphragm, as in Fig. 34, or through the medium of a removable base, as in Figs. 35 and 37, as preferred.

The weigh-case frame 278 may be made in one piece with the pillar 262, or separately, as preferred. It is provided with a shelf, 279, for the reception of weights 280, for application to a weight-rod, 281, suspended from the beam 203 in customary manner.

207 represents a rod composed of brass or other metal more expansible by heat than that of which the pillar 262 and case are composed. Said rod is made adjustable in its effective length, and acts, through the medium of a suitable spring, 208, to bear down on the base of the column with a pressure varying with the temperature, so as to counteract the pressure from expansion of the liquid in the pressure-chamber.

The weigh-beam is connected to the casing by a flexible compression fulcrum-plate, 282, clamped to a fulcrum-block, 283, which is bolted to the frame. The column 259 acts on the beam through a compression-plate, 284. The indicator-rod 285 is suspended from the upper part of the case by thin-plate connections 286, and connects by bracket 287 and thin plates 288 with the weight end of the beam 203 in substantially the manner described in another application.

289 is a weight-rod attached to the lugs or brackets 290 291 at the ends of the beam, and carrying a balancing-weight, 292, and a weighing-weight, 293, the latter being used in connection with the small graduations shown on the beam. This device is described and claimed in another application. A sliding weight, 294, is used in connection with graduations (seen at the upper part of the beam) for weighing quantities between those indicated by the large weights 280 and small fractional weight 293.

295 represents a tare-weight sliding on the rod 289, and limited in its motion by an adjustable stop, 296, so as to permit a range of motion to the tare-weight equal in value to the weight of the scoop or other object which the said tare-weight may be required to balance. The scale being properly balanced, with the scoop or other tare-load on the platform and the tare-weight 295 against the lug 291 at the extremity of the beam, the stop 296 is so adjusted that when the tare-weight is slid back against it the scale will balance with the scoop off.

297 represents a secondary tare-weight sliding on the indicator-rod. 298 is a combined guide-plate and indicator-plate attached to the beam at or near its fulcrum end.

The bed is constructed with inwardly-projecting lugs 241ª, Figs. 28, 30, 31, with apertures for the reception of screw-bolts 241ᵇ, each passing freely through the said lugs or eyes, and fixed in the under side of the platform 244, leaving sufficient play between the said bolts and the lugs or eyes 241ª. The upper edge of the bed constitutes a stop to limit the descent of the platform by the contact of the flange projecting above said upper edge. The heads of the screws 241ᵇ constitute stops to limit the upward movement of the platform, so that an attempt to lift the scale by its platform will not cause a separation and derangement of the parts or any other injurious effect.

Whatever novel subject-matter I have set forth and not claimed or attempted to claim herein I have claimed or attempted to claim in other applications or have reserved to be claimed in future original applications.

The following is claimed as new:

1. In weighing-scales, in combination with hydraulic-pressure supports, the bed-frame constructed with shelves 243 at the corners for the reception of said supports, as herein described.

2. The combination of the shelf 243, support-base 245, case 247, and screws 249 for connecting the said parts, as herein described.

3. In combination with a platform, 234, and the pressure-column 248 of a hydraulic support, one or more supporting-springs, 251, interposed directly between the said platform and pressure column or columns, substantially as set forth.

4. The combination of the flanged bed 241, the hydraulic platform support or supports, the liquid-pressure pipes 252, the pressure chamber or chambers 275, the base-plate 258, the pressure-column 259, and the flanged pillar 262, as and for the purposes set forth.

5. The continuous-pressure diaphragm 246, suitably secured to a base-lining, 272, substantially as set forth.

6. The combination of the diaphragm 246, lining 272, sealing-plug 253ª, with raised nipple 273, and the pressure-pipe 252, as and for the purposes set forth.

7. The removable pressure-column base 258, constituting a nut, in combination with a fixing-plate, 260, secured to the column by said screw-base, as described.

8. The combination of the flanged bed 241, chamber-plate 275, clamping-ring 261, flexible fixing-plate 260, and flanged pillar 262, substantially as set forth.

9. In a hydraulic scale, the chamber-stem 275ª, with a vent, 299, permitting the escape of air while the plug 254 is entering, as explained.

10. The combination, with the weigh-beam 203, of the weight-rod 289, weighing-weight 293, tare-weight 295, and adjustable stop 296, as and for the purposes set forth.

11. The combination of the bed 241, lugs 241ª, screws 241ᵇ, and platform 244, as and for the purposes set forth.

ALBERT H. EMERY.

Witnesses:
OCTAVIUS KNIGHT,
MAHLON RANDOLPH.